3,201,485
PROCESS FOR PREPARING POLYALKYLATED BENZENES FROM ALKYL KETONES
Stephen M. Kovach, Highland, Ind., assignor to Sinclair Research, Inc., Wilmington, Del., a corporation of Delaware
No Drawing. Filed Dec. 15, 1961, Ser. No. 159,762
5 Claims. (Cl. 260—668)

This invention relates to a process for preparing polyalkylated benzenes from alkyl ketones and in a particular aspect concerns the production of mesitylene through the condensation of acetone, employing certain novel catalysts.

Mesitylene is a well-known valuable chemical having various uses such as an intermediate for the production of plasticizers and trimesic acid. Although it is present in catalytic reformates, it is difficult to separate by conventional means due to the presence of other close boiling $C_9$ aromatic hydrocarbons. Consequently, mesitylene is generally produced by the selective condensation of acetone in the presence of liquid acid catalysts, such as sulfuric acid. These methods, however, aside from effecting low yields of mesitylene have many other drawbacks, particularly with regard to the corrosion problem they present.

It has now been found that polyalkylbenzenes can be obtained in good yields by the vapor phase condensation of an alkyl ketone over a catalyst selected from the group consisting of chromia-boria on alumina or chromia-zinc oxide on silica-alumina. The condensation reaction of the present invention employs a temperature of about 300 to 1000° F., preferably about 400 to 800° F. In general the reaction conditions are exemplified by pressures of about 0 to 2000 p.s.i.g., preferably about 0 to 1000 p.s.i.g., and a weight hourly space velocity (WHSV) of about .01 to 10, preferably about 0.1 to 5. If desired, inert diluents, such as nitrogen, may be employed in the reaction. In addition, and preferably, hydrogen can be used in place of inert diluent. Conducting the reaction in the presence of molecular hydrogen is advantageous in that it reduces coke formation and enhances yield. If utilized the inert gas diluent or hydrogen is generally present in a mole ratio of feed to diluent of about 1 to 20:1, preferably about 1 to 10:1.

Alkyl ketones utilizable as starting materials for the process of the present invention can be represented by the following structural formula:

wherein R is a lower alkyl radical of say about 1 to 4 carbon atoms or more and R' is a hydrocarbon radical of 1 to 12 carbon atoms, preferably aliphatic and most advantageously a lower alkyl radical. Examples of suitable methyl alkyl ketones are acetone, methyl ethyl ketone, methyl propyl ketone, methyl isopropyl ketone, etc.

The chromia-boria-alumina catalyst of the present invention contains catalytically effective amounts of chromia and boria. Generally, these amounts will fall in the range of about 1–20% chromia, preferably about 5 to 10% by weight and about 3–20% by weight of boria, preferably about 5 to 15%. The chromia and boria constituents of the catalyst are deposited on an alumina base, preferably of the activated or calcined type. The base is usually the major component of the catalyst, generally constituting at least about 60 weight percent on the basis of the catalyst, preferably at least about 75–90%. The preferred catalyst base is an activated or gamma alumina such as those derived by calcination of amorphous hydrous alumina, alumina monohydrate, alumina trihydrate or their mixtures. The catalyst base precursor most advantageously is a mixture predominating, for instance, about 65–95 weight percent in one or more of the alumina trihydrates bayerite I, bayerite II (randomite) or gibbsite, and about 5–35 weight percent of alumina monohydrate (boehmite), amorphous hydrous alumina or their mixture. The alumina base can contain small amounts of other non-deleterious solid oxides or promoters.

The chromia-zinc oxide on silica-alumina catalyst also contains catalytically effective amounts of ZnO and chromia. These amounts will generally fall within the range of about 1 to 20% ZnO, preferably about 5 to 15% and 1 to 20% chromia, preferably about 3 to 10%. The silica-alumina base of this catalyst can be a natural silica-alumina or a synthetic type of silica-alumina precipitated on silica type. It is preferred that the silica-alumina base contain at least about 50% silica up to about 95% silica. Popular synthetic gel silica-aluminas generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The silica-alumina may be only partially of synthetic material; e.g., as may be made by precipitation of silica-alumina on an activated clay. One example of such silica-alumina contains about equal amounts of silica, alumina gel and clay.

The chromia component in each of the catalysts can be added to the respective supports by known procedures involving impregnation using a water-soluble compound of chromia or by coprecipitation. Suitable water-soluble compounds include chromium nitrate, sulfate or chloride, chromic acid, etc. Chromium nitrates are preferred in that they have the advantage of decomposing to the oxides after calcination without leaving a residue which is difficult to wash out. The support containing the chromia component can be dried and calcined usually at a temperature from about 750–1200° F. or more. The boria and zinc oxide components of the catalysts can be added at any stage of preparation. They may be incorporated in the support, for instance, by precipitation, coprecipitation, impregnation and mulling either before or after addition of the chromia. They may also be applied by impregnation from solutions (water, organic or inorganic solvents) or from gas. However, they are frequently added to the catalyst support after it has been formed by tabletting or extrusion and calcined. After the boria or zinc oxide is added to the support in this procedure, the catalyst can be recalcined.

The catalysts of the present invention can be easily regenerated employing conventional procedures, for instance, by subjecting them to an oxygen-containing gas at temperatures sufficient to burn off carbon deposited on the catalyst during the condensation reaction. This oxygen-containing gas, e.g., an oxygen-nitrogen mixture, may contain about 0.01 weight percent to about 5 weight percent oxygen and is preferably introduced at a flow rate such that the maximum temperature at the site of combustion is below about 1000° F.

The present invention will be further illustrated by the following examples:

EXAMPLE I

A Universal 1″ Internal Diameter Stainless Steel Reactor was charged with catalyst comprising 10% chromia-10% boria-alumina. Acetone together with molecular hydrogen in a mole ratio of 3:1 were passed through the reaction zone under the condition shown in Table I below. The results of the product analysis are shown in Table I below:

*Table I*
Catalyst: 10% $Cr_2O_3$—10% $B_2O_3$—$Al_2O_3$
Feed: Acetone

| Run 1122 | 35A | 35B |
|---|---|---|
| Conditions: | | |
| Temperature, °F | 640 | 700 |
| Pressure, p.s.i.g | 100 | 200 |
| WHSV | 0.45 | 0.72 |
| $H_2$/H'C | 3/1 | 3/1 |
| Product Distribution, Wt. Percent Feed: | | |
| Mesitylene | 16.6 | 24.2 |
| Isophorone | 4.7 | 8.0 |
| Phorone | | 1.3 |
| Propane | 1.5 | 2.4 |
| Acetone | 1.8 | 2.2 |
| Isopropyl Ether | 0.5 | 0.8 |
| Isopropanol | 0.3 | 0.6 |
| Coke on Catalyst | | 2.72 |

EXAMPLE II

Example I was repeated employing a 10% zinc oxide-5% chromia-silica-alumina catalyst under the conditions shown in Table II. The results are also shown in Table II:

*Table II*
Catalyst: 10% ZnO—5% $Cr_2O_3$/$SiO_2$—$Al_2O_3$
Feed: Acetone

| Run 1122 | 95 | 96 |
|---|---|---|
| Conditions: | | |
| Temperature, °F | 700 | 550 |
| Pressure, p.s.i.g | 100 | 200 |
| WHSV | 0.5 | 0.5 |
| $H_2$/H'C | 3/1 | 3/1 |
| Product Distribution, Wt. Percent Feed: | | |
| Mesitylene | 15.3 | 18.4 |
| Isophorone | 3.5 | |
| Phorone | | |
| Propane | 1.6 | 2.2 |
| Acetone | 2.0 | 2.8 |
| Isopropyl Ether | 0.4 | |
| Isopropanol | .05 | |
| Coke on Catalyst | 3.8 | 1.45 |

The data of Tables I and II demonstrate the advantageous yields of mesitylene provided by the novel catalysts of the present invention.

It is claimed:

1. A process for the preparation of a polyalkylated benzene which comprises reacting in the presence of molecular hydrogen an alkyl ketone having the structural formula:

wherein R is a lower alkyl radical and R' is a hydrocarbon radical of 1 to 12 carbon atoms in the vapor phase at a temperature of about 300–1000° F. and in the presence of a catalyst selected from the group consisting of alumina containing catalytic amounts of chromia and boria and silica-alumina containing catalytic amounts of chromia and zinc oxide.

2. The process of claim 1 wherein the alkyl ketone is a methyl lower alkyl ketone.

3. The process of claim 2 wherein the temperature employed is about 400–800° F.

4. A process for the preparation of mesitylene which comprises reacting acetone in the vapor phase in the presence of molecular hydrogen at a temperature of about 400–800° F. and in the presence of a catalyst selected from the group consisting of alumina containing catalytic amounts of chromia and boria, and silica alumina containing catalytic amounts of chromia and zinc oxide.

5. The method of claim 4 wherein the catalyst selected is alumina containing about 1–20% by weight chromia and about 3–30% by weight of boria.

References Cited by the Examiner
UNITED STATES PATENTS

| | | | |
|---|---|---|---|
| 2,408,167 | 9/46 | Hepp | 260—668 |
| 2,419,142 | 4/47 | Ipatieff et al. | 260—668 |
| 2,429,361 | 10/47 | Linn et al. | 260—668 |

ALPHONSO D. SULLIVAN, *Primary Examiner.*

UNITED STATES PATENT OFFICE
CERTIFICATE OF CORRECTION

Patent No. 3,201,485                                August 17, 1965

Stephen M. Kovach

It is hereby certified that error appears in the above numbered patent requiring correction and that the said Letters Patent should read as corrected below.

Column 4, line 34, for "3-30%" read -- 3-20% --.

Signed and sealed this 15th day of March 1966.

(SEAL)
Attest:

ERNEST W. SWIDER                                EDWARD J. BRENNE

Attesting Officer                                      Commissioner of Patent